United States Patent Office 3,740,417
Patented June 19, 1973

3,740,417
(2-IMIDAZOLIN-2-YLAMINO)SUBSTITUTED
BENZO[b]THIOPHENES
Hans-Jurgen E. Hess, Old Lyme, and Roger P. Nelson, Waterford, Conn., assignors to Pfizer Inc., New York, N.Y.
No Drawing. Continuation of application Ser. No. 15,864, Mar. 2, 1970. This application Dec. 1, 1971, Ser. No. 203,863
Int. Cl. C07d 49/34
U.S. Cl. 260—309.6                    7 Claims

ABSTRACT OF THE DISCLOSURE

Substituted benzo[b]thiophenes selected from the group consisting of those wherein the substituents are:

(a) 5-(2-imidazolin-2-ylamino)-3,4-dichloro-,
(b) 5-(2-imidazolin-2-ylamino)-3,4,6-trichloro-,
(c) 4-(2-imidazolin-2-ylamino)-5-chloro-,
(d) 4-(2-imidazolin-2-ylamino)-5,7-dichloro-,
(e) 4-(2-imidazolin-2-ylamino)-3,5-dichloro-,
(f) 6-(2-imidazolin-2-ylamino)-5,7-dichloro-,
(g) 7-(2-imidazolin-2-ylamino)-6-chloro-,
(h) 3-(2-imidazolin-2-ylamino)-2-chloro-,
(i) 2-(2-imidazolin-2-ylamino)-3-chloro, the corresponding bromo analogs;

and the pharmaceutically-acceptable acid addition salts thereof, useful as antihypertensive agents and methods for their preparation.

CROSS-REFERENCE TO RELATED APPLICATION

This application is a continuation of copending application Ser. No. 15,864, filed Mar. 2, 1970, now abandoned.

BACKGROUND OF THE INVENTION

This invention relates to a series of new antihypertensive agents; namely (2-imidazolin-2-ylamino)substituted benzo[b]thiophenes, intermediates therefor, and method for the preparation of such compounds.

The search for an effective treatment of hypertension, a widespread and complex disease of mysterious etiology, has led to the development of a wide variety of pharmacologic agents of diverse and, frequently, unrelated structure. Included among such agents are 2-substituted 1,3-diazocycloalkenes; i.e., imidazolin and 1,2,3,4-tetrahydropyrimidine derivatives, wherein the 2-substituent is a (1,2,3,4-tetrahydro-1-quinolyl)-, a (1,2,3,4-tetrahydro-2-isoquinolyl)-, a phenylamino- or a naphthylamino group (U.S. Pats. 2,876,222; 2,876,229; 2,889,434; and Canadian Pat. 625,631, respectively), and 2-(2'-haloanilino)-1,3-diazacyclopentenes (Belgian Pats. 687,566 and 687,-567).

Despite the existence of a large number and variety of antihypertensive agents, there is no one agent which is effective against all major types of hypertension. Additionally, many of the currently available agents produce undesirable side-effects when administered to animals, including man. The efficacy, mechanism of action and side-effects of a number of drugs for the chemotherapeutic treatment of hypertension are summarized by Gifford in "Drugs of Choice, 1968–1969," The C. V. Mosby Company, St. Louis, Mo., 1967, chapter 24, pages 376–388.

In view of the above remarks, it is evident that new drugs are urgently needed to supplement the antihypertensive armamentarium.

SUMMARY OF THE INVENTION

It has now been found that certain novel substituted benzo[b]thiophenes wherein the substituents are:

(a) 5-(2-imidazolin-2-ylamino)-3,4-dichloro-,
(b) 5-(2-imidazolin-2-ylamino)-3,4,6-trichloro-,
(c) 4-(2-imidazolin-2-ylamino)-5-chloro-,
(d) 4-(2-imidazolin-2-ylamino)-5,7-dichloro-,
(e) 4-(2-imidazolin-2-ylamino)-3,5-dichloro-,
(f) 6-(2-imidazolin-2-ylamino)-5,7-dichloro-,
(g) 7-(2-imidazolin-2-ylamino)-6-chloro-,
(h) 3-(2-imidazolin-2-ylamino)-2-chloro-,
(i) 2-(2-imidazolin-2-ylamino)-3-chloro-, the corresponding bromo analogs;

and the pharmaceutically-acceptable acid addition salts thereof;

are highly effective antihypertensive agents. They are also useful as vasoconstrictors.

Included among the pharmaceutically-acceptable salts are the water-soluble and water-insoluble salts such as the hydrochloride, hydrobromide, phosphate, nitrate, sulfate, acetate, citrate, gluconate, benzoate, propionate, butyrate, sulphosalicylate, maleate, laurate, malate, fumarate, succinate, oxalate, tartrate, amsonate (4,4'-diaminostilbene-2,2'-disulfonate), pamoate (1,1'-methylene-bis-2-hydroxy-3-naphthoate), stearate, 2-hydroxy-3-naphthoate, hexafluorophosphate, toluene-p-sulfonate and glycolate salt.

The novel products of this invention are prepared according to known procedures. The overall yields are generally satisfactory and the process is readily adaptable to industrial procedures. The process comprises reaction of an isothiouronium derivative of an appropriate benzo[b]thiophene compound with ethylenediamine. The isothiouronium derivative is used in the form of an acid addition salt such as the hydrochloride, hydrobromide, hydroiodide, sulfate or p-toluenesulfonate salt. The reaction of the isothiouronium salt with ethylenediamine is generally carried out in a polar hydroxylic solvent such as water, a lower alkanol; that is, an alkanol containing up to five carbon atoms, or a lower alkanediol such as ethylene or trimethylene glycol. A solvent is, however, not necessary as is illustrated herein.

The temperature of the reaction is not critical but can vary over the range of from about 20° C. to about 200° C. The preferred temperature range when using a solvent is between 60° C. and 120° C. When the reaction is conducted in the absence of a solvent, the preferred temperature is from 140° C. to 200° C.

The reaction period depends upon the reactants and the reaction conditions, especially upon the temperature. The reaction period, in general, will vary from a few minutes, e.g., about fifteen minutes, to as long as two to three days. For a given set of reactants, however, the higher the reaction temperature, the shorter the reaction period. The use of elevated reaction temperatures is, of course, readily achieved by conducting the reaction in the absence of a solvent. Under such conditions the reaction period will generally range from about fifteen minutes to about eight hours.

Again, for a given set of reactants, the reaction when conducted in a polar hydroxylic solvent such as water or a lower alkanol generally requires a longer reaction period than does the reaction when conducted without a solvent since lower temperatures are used. The use of a lower alkanediol as solvent permits the attainment of higher temperatures and shorter reaction periods.

The presence of acetic acid appears to improve the yields of this reaction. The amount of acetic acid used is conveniently based upon the isothiouronium salt, and on a molar basis can range from about 1:1 to about 10:1 moles of acetic acid per mole of isothiouronium salt.

The isothiouronium salt and ethylenediamine are reacted in at least about a 1:1 molar ratio. Since the isothiouronium salt is the least readily available of these two reactants, it is advantageous from an economic standpoint to employ an excess of the ethylenediamine reactant to ensure maximum conversion of the isothiouronium salt to the imidazoline compound desired.

The molar ratios of isothiouronium salt to ethylenediamine can range from about 1:1 to about 1:10. Larger excesses of ethylenediamine can, of course, be used but offer no advantage. From a practical standpoint, molar ratios of from about 1:1 to about 1:4 are preferred since they minimize subsequent recovery problems.

The acid addition salts of the (2-imidizalin-2-ylamino) substituted benzo[b]thiophenes described herein are prepared according to known procedures as, for example, by adding the appropriate acid to a solution or suspension of the free base in a suitable solvent, e.g., a lower alkanol (methanol, ethanol, isopropanol), acetone, ether, water. From a practical standpoint, the acid is added to the chosen base in the form of a solution in a suitable solvent such as those enumerated above. The acid addition salts are recovered by filtration, precipitation with a non-solvent or by evaporation of the solvent.

The requisite isothiouronium derivatives of the benzo[b]thiophene compounds (referred to herein as pseudoureas) are prepared by known procedures from the corresponding thiourea compound. The reaction broadly comprises reacting the appropriate thiourea benzo[b]thiophene with methyl iodide in a lower alkanol, e.g., methanol, isopropanol, in a molar ratio of from about 1:1 to about 1:10. The proportion of methyl iodide used is not critical. It is advantageous in order to achieve maximum utilization of the thiourea to use an excess of the methyl iodide. The reaction can be conducted over the temperature range of from about 40° C. to the reflux temperature of the solvent. The thiourea compound, in turn, is prepared from the corresponding amino benzo[b]thiophene by reacting the amino derivative with benzoylisothiocyanate in a suitable solvent such as acetone. The benzoylthiourea which precipitates is recovered and the benzoyl group removed under alkaline hydrolysis.

The necessary amine substituted benzo[b]thiophenes, several of which are known, are prepared according to standard procedures. For example, 3-aminobenzo[b]thiophene is produced by the nitration of benzo[b]thiophene followed by catalytic reduction using 10% Pd-C and NaBH₄. Similarly, 3-amino-2-chlorobenzo[b]thiophene is prepared by the direct nitration of 2-chlorobenzo[b]thiophene followed by catalytic reduction, as described above, of the nitro group. Chloro and bromo groups can be introduced into the benzo[b]thiophene nucleus at any one of several stages of the overall synthetic routes exemplified herein. Chloro, for example, is readily introduced into the appropriate benzo[b]thiophene, e.g., 5-(2-imidazolin-2-ylamino)benzo[b]thiophene by treatment thereof with N-chlorosuccinimide. The resulting mixture of 3,4-dichloro- and 3,4,6-trichloro derivatives is separated by chromatography. Alternatively, direct chlorination of benzo[b]thiophene affords 3-chlorobenzo[b]thiophene. Still further, chloro groups can be introduced into the nucleus via the diazonium reaction. 6-chloro-7-aminobenzo[b]thiophene, for example, is produced by the nitration of 6-acetamidobenzo[b]thiophene (prepared by acylation of 6-aminobenzo[b]thiophene, J. Org. Chem. 21, 265–270, 1956) to 6-acetamido-7-nitrobenzo[b]thiophene which is then converted to the corresponding diazonium salt and treated with cuprous chloride and hydrochloric acid to give 6-chloro-7-nitrobenzo[b]thiophene. Catalytic reduction of the nitro group provides the desired compound.

Bromo groups are conveniently introduced into the benzo[b]thiophene nucleus by known procedures, e.g., by reaction with elemental bromine in chloroform solution. Alternatively, the diazonium reaction route, but using cuprous bromide and hydrobromic acid in place of the corresponding chloro compounds, can be used.

It is indeed surprising, by analogy to the prior art cited above, that not all chloro- or bromo-substituted (2-amidazolin-2-ylamino)benzo[b]thiophenes are effective antihypertensive agents. A certain specificity of structure-activity exists in the present novel compounds. Substituted benzo[b]thiophenes wherein the substituents are:

5-(2-imidazolin-2-ylamino)-,
4-(2-imidazolin-2-ylamino)-,
3-(2-imidazolin-2-ylamino)-,
4-(2-imidazolin-2-ylamino)-3-bromo-,
4-(2-imidazolin-2-ylamino)-2,3,5-trichloro-, or
4-(2-imidazolin-2-ylamino)-3-bromo-5,6-dichloroare inactive as antihypertensive agents.

The antihypertensive property of the novel compounds of this invention is determined by intra-arterial administration to anesthetized normotensive dogs (Constantine et al., European J. Pharmacol. 4, 109, 1968) and/or by oral administration to conscious hypertensive dogs (Goldblatt et al., J. Exptl. Med. 59, 347, 1934). In the oral evaluation procedure, the systolic arterial blood pressure of the dogs ranged from 140–180 mm. The substances are administered orally in capsules on consecutive days in the form of their hydrochloride salts. The systolic pressure is determined on the coccygeal artery according to the method of Priolo and Winbury (J. Appl. Physiol, 15, 323, 1960) prior to drug administration and 2, 4, 6 and 24 hours thereafter. Three dogs are used for the evaluation of each compound. Pertinent data are present below. Maximum antihypertensive effect is generally observed after two to four hours.

ORAL ADMINISTRATION—CONSCIOUS DOG RESULTS

| Benzo[b]thiophene | Dose, mcg./kg. | Number of dogs | B.P. lowering (mm.) |
|---|---|---|---|
| 3-(2-imidazolin-2-ylamino)-2-bromo- | 1,000 | 3 | 20, 35, 15 |
| 4-(2-imidazolin-2-ylamino)-3,5-dichloro- | 100 | 3 | 20, 25, 25 |
|  | 1,000 | 3 | 35, 40, 40 |
| 4-(2-imidazolin-2-ylamino)-5,7-dichloro- | 100 | 3 | 18, 20, 20 |
| 5-(2-imidazolin-2-ylamino)-3,4,6-trichloro- | 400 | 3 | 10, 10, 15 |
| 5-(2-imidazolin-2-ylamino)-3,4-dichloro- | 400 | 3 | 20, 20, 10 |
|  | 2,000 | 3 | 40, 55, 45 |

The compounds of this invention may be administered to a hypertensive subject alone, but are generally administered as a composition with a pharmaceutical carrier selected on the basis of the chosen route of administration and standard pharmaceutical practice. For example, they may be administered orally in the form of tablets containing such excipients as starch, milk sugar, certain types of clay, etc.; in capsules, either alone or in admixture with the same or equivalent excipients; orally, in the form of elixirs; or oral suspensions which may contain flavoring or coloring agents. They may be injected parenterally; that is, for example, intramuscularly or subcutaneously. For parenteral administration, they are best used in the form of a sterile aqueous solution which may contain other solutes, for example, enough saline or glucose to make the solution isotonic.

The physical will determine the dosage most suitable for an individual patient; and it will, of course, vary with the form of administration, the age, weight and response of the particular patient. An effective dosage range is from about 0.05 mg./kg. of body weight/day to about 1.0 mg./kg. of body weight/day. It has been found that dosage units containing from 0.1 mg. to 10 mg. are generally useful. Those dosage unit forms which are prepared for subcutaneous administration will most usually contain the lowest concentration of the active ingredient. Dosage forms for intramuscular administration will be somewhat higher; and those dosage forms intended for oral administration, for example, elixirs, tablets or capsules, will contain still more of the active ingredient.

As noted above, compositions of this invention may take a variety of forms. Various diluents may be employed and the percentage of active ingredient may be varied. It is necessary that the active ingredient constitute a proportion of the composition such that a suitable dosage form will be obtained. Obviously, several dosage unit forms may be administered at about the same time. Although a composition with less than 0.05% of the active ingredient is useful, it is preferred to use compositions containing at least 0.05%. Activity increases with concentration of the agent. It has been found that the percentage of active ingredient may be 10%, 50%, 75%, 90%, or an even higher proportion. For example, tablets may be prepared with a minor proportion of binding agent or diluent and a major proportion of active materials. Tablets containing from 0.1 mg. to 10 mg. are particularly useful.

The following examples are given solely for the purpose of illustration.

EXAMPLE I 5-(2-imidazolin-2-ylamino)-benzo[b]thiophene (A) 1-(5-benzo[b]thiophenyl)-2-thiourea.—To a solution of 2.81 g. (0.0369 mol) of ammonium thiocyanate in 60 ml. of acetone and under an atmosphere of nitrogen is added 4.71 g. (0.0335 mol) of benzoyl chloride. The reaction is refluxed for five minutes then cooled to 40° C. A solution of 5.00 g. (0.0335 mol) of 5-aminobenzo[b]thiophene in 60 ml. of acetone is then added over a period of fifteen minutes and the reaction mixture heated at reflux for one hour.

It is then cooled, poured into 600 ml. of crushed ice, and the precipitated benzoyl thiourea filtered and air dried. The dried benzoyl thiourea is heated a half hour in a solution of 20 ml. of ethanol and 150 ml. of 2 N sodium hydroxide using a steam cone. The ethanol is then removed by evaporation, the mixture cooled and acidified with concentrated hydrochloric acid. The mixture is then made slightly basic with concentrated ammonium hydroxide and the resulting precipitate filtered. The crude product is washed with ether and dried over phosphorous pentoxide to give 6.20 g., 89% yield of the thiourea; M.P. 203–205° C.

(B) 2-methyl-2-thio-1-(5-benzo[b]thiophenyl)pseudourea hydroiodide.—To a suspension of 5.95 g. (0.0286 mol) of 1-(5-benzo[b]thiophenyl)-2-thiourea in 200 ml. of methanol is added 16.2 g. (0.114 mol) of methyl iodide. The reaction is heated at reflux for forty-five minutes, then concentrated on a steam cone, replacing the methanol with isopropyl ether. The reaction mixture is cooled, and the product filtered and washed with isopropyl ether to give 9.50 g., 95% of product, melting at 183–185° C.

(C) 5-(2-imidazolin-2-ylamino)-benzo[b]thiophene.— A solution of 9.00 g. (0.0257 mol) of 2-methyl-2-thio-1-(5-benzo[b]thiophenyl)pseudourea hydroiodide, 2.28 ml. (0.0514 mol) of acetic acid, 4.60 g. (0.103 mol) of ethylenediamine and 50 ml. of tert-butyl alcohol is refluxed for 16 hours. The reaction mixture is then cooled and concentrated to an oil. The oil is made basic with 100 ml. of 2 N sodium hydroxide, and the mixture extracted with chloroform. The chloroform extracts are washed with water, dried over anhydrous sodium sulfate, then decolorized by treatment with charcoal. Removal of both the sodium sulfate and charcoal, followed by removal of the chloroform, gave 4.24 g. of oily residue. The residue is dissolved in ethyl acetate and eluted through a column (1¼" x 10") of silica gel (28–200 mesh). The initial substance obtained from the column is the byproduct, 5-aminobenzo[b]thiophene (2.20 g.). Increasing the polarity of the eluting agent to methanol yields no further compounds. The column is allowed to dry, then extracted with acetic acid. Removal of the acetic acid gives an oil which is crystallized from ethyl acetate. Filtration of the crystals, followed by washing with ethyl acetate, gives 500 mg. of product; M.P. 79–81° C. Concentration of the filtrate (ethyl acetate) provides an additional 0.60 g. of the desired product.

I.R. $\nu_{max.}^{KBr}$ (cm.$^{-1}$) 3450, 2860, 1690

EXAMPLE II 5-(2-imidazolin-2-ylamino)-3,4-dichlorobenzo[b]thiophene and 5-(2-imidazolin-2-ylamino)-3,4,6-trichlorobenzo[b]thiophene To a solution of 0.738 g. (0.00552 mol) of N-chlorosuccinimide in 30 ml. of benzene is added 0.600 g. (0.00276 mol) of 5-(2-imidazolin-2-ylamino)-benzo[b]thiophene. The mixture is heated at reflux for 1.5 hours, an additional 0.185 g. (0.00138 mol) of N-chlorosuccinimide added and refluxing continued for 16 more hours. The mixture is cooled, and the insoluble material removed by filtration. The precipitate is treated with chloroform, filtered and the filtrate washed successively with 1 N sodium hydroxide and water. Drying of the chloroform extracts with anhydrous sodium sulfate followed by treatment with charcoal and concentration of the solution gives 0.280 g. of oil. The oil is chromatographed using silica gel thick layer plates and ethyl acetate-5 percent diethylamine as the eluent. After two passes of eluent over the plate, two materials separate. The more polar substance is removed and treated with ethanolic hydrogen chloride to give 0.102 g. of the dichloro imidazoline compound as the hydrochloride salt; M.P. 261°–264° C.

P.M.R. $T_{(CD_3)_2SO}$ (hydrochloride salt)—0.1 (1H, singlet), 1.52 (2H, singlet), 1.81 (1H, doublet, J=6.5 Hz.), 1.88 (1H, singlet), 2.48 (1H, doublet, J=6.5 Hz.), 6.33 (4H, singlet).

The less polar spot is recovered from the silica gel by means of methylene chloride, the methylene chloride evaporated, the residue dissolved in ether and treated with ethanolic hydrogen chloride to give 0.086 g. of the trichlorinated imidazoline compound as the hydrochloride salt.

P.M.R. $T_{(CD_3)_2SO}$ (hydrochloride salt)—1.07 (1H, singlet), 1.40 (2H, singlet), 1.48 (1H, singlet), 1.84 (1H, singlet), 6.33 (4H, singlet).

EXAMPLE III 4-(2-imidazolin-2-ylamino)-5,7-dichlorobenzo[b]thiophene (A) 5-chloro-4-nitrobenzo[b]thiophene.—To 170 ml. of concentrated sulfuric acid cooled to 5° C. is added 24.4 g. (0.354 mol) of sodium nitrite and the solution heated to 70° C., then cooled to 5° C. A solution of 23.66 g. (0.122 mol) of 5-amino-4-nitrobenzo[b]thiophene in 414 ml. of acetic acid is then added to the mixture at a temperature below 10° C. The diazonium solution is added to a solution of 50.0 g. (0.51 mol) of cuprous chloride in 200 ml. of concentrated hydrochloric acid and the reaction stirred at room temperature for 15 minutes, then at 60° C. until nitrogen evolution ceased. The mixture is cooled, water added, and the yellow precipitate filtered and recrystallized from ethanol to yield 23.51 g., 90.8 percent of 5-chloro-4-nitrobenzo[b]thiophene; M.P. 119°–120° C.

(B) 4-amino-5,7-dichlorobenzo[b]thiophene.—A suspension of 23.5 g. (0.111 mol) of 5-chloro-4-nitrobenzo[b]thiophene in 500 ml. of acetic acid is heated to 70° C., a solution of 124.5 g. (0.55 mol) of stannous chloride dihydrate in 280 ml. of concentrated hydrochloric acid added dropwise, and the reaction stirred at 75° C. for a half hour. The heavy white precipitate which forms is filtered, then suspended in 3.4 liters of hot water and made basic with 150 ml. of 50 percent sodium hydroxide solution. The mixture is heated for five minutes then cooled, and the grayish solid filtered. The solid is dissolved in ether, and the ether solution dried over anhydrous sodium sulfate. Concentration of the filtrate affords 12.5 g., 51.5%, of 4-amino-5,7-dichlorobenzo[b]thiophene; M.P. 86°–88° C. Upon recrystallization from ethanol, it melts at 96.5°–97.5° C.

(C) 1 - (5,7 - dichloro-4-benzo[b]thiophenyl)-2-thiourea.—To a solution, under nitrogen, of 5.70 g. (0.075 mol) of ammonium thiocyanate in 50 ml. of acetone is added 9.56 g. (0.068 mol) of benzoyl chloride. The reaction mixture is heated at reflux for ten minutes, then treated with a solution of 12.51 g. (0.057 mol) of 4-amino-5,7-dichlorobenzo[b]thiophene in 75 ml. of acetone. The reaction mixture is refluxed for forty minutes, then cooled and poured into 300 ml. of water. The resulting precipitate of benzoyl thiourea (M.P. 193°–195° C.) is filtered, washed with ether, and placed in a solution of 200 ml. of 10% aqueous sodium hydroxide in 1200 ml. of water. The mixture is heated on a steam cone for forty-five minutes, then filtered, cooled and made acidic with hydrochloric acid. The mixture is then made basic (pH ~8) with concentrated ammonium hydroxide, cooled and filtered. The precipitate is washed with ether to give 16.4 g., ~100 percent, of product; M.P. 222.5°–224° C.

(D) 2 - methyl-2-thio-1-(5,7-dichloro-4-benzo[b]thiophenyl)pseudourea hydroiodide.—A solution of 16.4 g. (0.059 mol) of the product of preparation C above and 10.4 g. (0.0733 mol) of methyl iodide in 225 ml. of methanol is refluxed for one hour, then cooled. Upon the addition of ether, the product precipitates to give 19.3 g., 78.1 percent of white solid; M.P. 209°–210° C.

(E) 4 - (2-imidazolin-2-ylamino)-5,7-dichlorobenzo[b]thiophene.—A mixture of 2.0 g. (0.00479 mol) of the pseudourea (preparation D above) and 0.51 g. (0.0085 mol) of ethylenediamine is heated in an oil bath for one one hour at 160° C. The reaction mixture is cooled and treated with 5 ml. of 10% aqueous sodium hydroxide. The excess ethylenediamine is removed via vacuum and the reaction mixture extracted with chloroform. The chloroform extracts are dried over anhydrous sodium sulfate, decolorized with charcoal, filtered, and concentrated to an oil. The oil is dissolved in ethanol and the solution treated with hydrogen chloride gas. The initial precipitate is the hydrochloride salt of 4-amino-5,7-dichlorobenzo[b]thiophene while the second solid is the desired product; M.P. 251.5°–253° C.; yield 35 percent.

I.R. $\nu_{max.}^{KBr}$ (cm.$^{-1}$) 3400, 3080, 2860, 1660

P.M.R. $T_{(CD_3)_2SO}$ (hydrochloride salt)—1.25 (1H, singlet), 1.53 (2H, singlet), 1.95 (1H, doublet, J=5.5 Hz.), 2.22 (1H, singlet), 2.52 (1H, doublet, J=5.5 Hz.), 6.38 (4H, singlet).

EXAMPLE IV 4-(2-imidazolin-2-ylamino)-5-chlorobenzo[b]thiophene (A) 4 - amino-5-chlorobenzo[b]thiophene.—To a suspension, under nitrogen, of 0.96 g. of 10% palladium on carbon in 212 ml. of water is added a solution of 15.09 g. (0.399 mol) of sodium borohydride in 339 ml. of water.

A solution of 42.4 g. (0.1985 mol) of 5-chloro-4-nitrobenzo[b]thiophene in 3 liters of methanol is added, and the reaction mixture stirred at room temperature for one hour. The catalyst is removed by filtration under nitrogen, the filtrate concentrated, and the solid removed by filtration. The filtrate is extracted with methylene chloride and the methylene chloride extracts dried over anhydrous sodium sulfate. Removal of the solvent gives a solid. The combined solids are dissolved in hexane, and the solution decolorized with charcoal. After removal of the charcoal, the hexane solution is cooled to give 28.7 g. (80 percent) of 4-amino-5-chlorobenzo[b]thiophene; M.P. 94°–95° C.

(B) 1 - (5-chloro-4-benzo[b]thiophenyl)-2-thiourea.—To a solution, under nitrogen, of 13.1 g. (0.172 mol) of ammonium thiocyanate in 100 ml. of acetone is added 21.9 g. (0.156 mol) of benzoyl chloride. The reaction mixture is heated at reflux for ten minutes, then treated with a solution of 28.7 g. (0.156 mol) of 4-amino-5-chlorobenzo[b]thiophene in 135 ml. of acetone. The reaction mixture is refluxed for an additional 1.2 hours, then cooled and poured into 600 ml. of water. The resulting precipitate of benzoyl thiourea (M.P. 190°–192° C.) is filtered, washed with ether and placed in a solution of 300 ml. of water in 500 ml. of 10% aqueous sodium hydroxide. The mixture is heated on a steam cone for forty minutes, then filtered, cooled and acidified with concentrated hydrochloric acid. The mixture is then made basic (pH ~8) with concentrated ammonium hydroxide, cooled and filtered. The precipitate is washed with ether to give 38.2 g., ~100 percent of product (M.P. 170–174° C.). Recrystallization of the crude product from ethanol affords the pure product; M.P. 194°–196° C.

(C) 2 - methyl - 2 - thio-1-(5-chloro-4-benzo[b]thiophenyl)pseudourea hydroiodide.—A solution of 37.9 g. (0.156 mol) of the thiourea product B above and 25.5 g. (0.179 mol) of methyl iodide in 200 ml. of methanol is heated at reflux for 1.25 hours. The reaction mixture is concentrated to a crystalline residue which is triturated with ether to give 46.75 g., 78%, of the desired chloro pseudourea; M.P. 210°–211° C.

(D) 4-(2-imidazolin-2-ylamino)-5-chlorobenzo[b]thiophene.—A solution of 35.12 g. (0.0914 mol) of the chloro pseudourea (product C), 10.5 ml. (0.184 mol) of acetic acid and 24.5 ml. (0.367 mol) of ethylenediamine in 280 ml. of tert-butyl alcohol is refluxed for fifty-three hours. The tert-butyl alcohol and ethylenediamine are then removed by vacuum distillation to give an oil. The oil is made basic with 10% aqueous sodium hydroxide and the mixture extracted with chloroform. The chloroform extract is dried over anhydrous sodium sulfate, filtered and concentrated to an oil. Treatment of the oil with ether produces a crystalline material giving 11.60 g., 50.7 percent, of the desired imidazoline product; M.P. 159.5°–161° C. It is converted to the hydrochloride salt by treating it in ethereal solution with ethanolic hydrochloric acid.

I.R. $\nu_{max.}^{KBr}$ (cm.$^{-1}$) 3390, 3080, 2860, 1660.

P.M.R. $T_{(CD_3)_2SO}$ (hydrochloride salt)—1.44 (1H, singlet), 1.53 (2H, singlet), 1.84 (1H, doublet, J=8.4 Hz.), 2.00 (1H, doublet, J=6.4 Hz.), 2.41 (1H, doublet, J=8.4 Hz.), 2.55 (1H, doublet, J=6.4 Hz.), 6.33 (4H, singlet).

EXAMPLE V 3-(2-amidazolin-2-ylamino)-2-chlorobenzo[b]thiophene (A) 3-aminobenzo[b]thiophene.—To a suspension of 1.12 g. of 10% Pd-C in 96 ml. of water under an atmosphere of nitrogen is added a solution of 4.00 g. (0.105 mol) of sodium borohydride in 100 ml. of water. After completion of the borohydride addition a solution of 7.80 g. (0.0434 mol) of 3-nitrobenzo[b]thiophene in 180 ml. of methanol is added to the reaction mixture. The temperature of the reaction rises to about 40° C. during the addition of the 3-nitrobenzo[b]thiophene. The reaction is stirred for five minutes and the catalyst removed via filtration through a supercel pad. The filtrate is extracted with ether, and the ether extracts dried over anhydrous sodium sulfate. Concentration of the filtrate yields 3.00 g., 46.3 percent, of 3-aminobenzo[b]thiophene.

(B) 1-(3-benzo[b]thiophenyl)-2-thiourea.—A solution of 1.68 g. (0.0221 mol) of ammonium thiocyanate and 2.82 g. (0.0201 mol) of benzoyl chloride in 10 ml. of acetone is heated at reflux for fifteen minutes in a nitrogen atmosphere, then cooled to 25° C. A solution of 3.00 g. (0.0201 mol) of 3-aminobenzo[b]thiophene in 20 ml. of acetone is added, and the reaction mixture refluxed for thirty minutes. The reaction mixture is then cooled, poured into water and the resulting benzoylthiourea (M.P. 207°–210° C.) filtered. The solid is dissolved in ~300 ml. of 10% aqueous sodium hydroxide and heated at ~85° C. for one hour. It is cooled, acidified with concentrated hydrochloric acid, then made slightly basic (pH ~8) with concentrated ammonium hydroxide and the precipitate filtered. Washing of the precipitate with ether gives 1.30 g., 31% yield, of the thiourea compound; M.P. 191.5°–193° C.

(C) 2-methyl-2-thio-1-(3 - benzo[b]thiophenyl)pseudourea hydroiodide.—A solution of 1.30 g. (0.0063 mol) of the thiourea compound of preparation B above and 1.06 g. (0.0075 mol) of methyl iodide in 100 ml. of methanol is refluxed for 1.25 hours. The reaction mixture is concentrated and the product precipitated with ether. Filtration and drying of the solid yield 1.98 g., 90% yield, of the pseudourea; M.P. 187°–188° C.

(D) 3-(2-imidazolin-2-ylamino)benzo[b]thiophene.— A solution of 1.48 g. (0.0042 mol) of the pseudourea of the above preparation, 1.06 g. (0.0168 mol) of ethylenediamine and 1.87 ml. (0.0312 mol) of acetic acid in 42 ml. of tert-butyl alcohol is refluxed for three hours. The reaction is cooled, made basic with 10% aqueous sodium hydroxide and concentrated under aspirator vacuum. The residual oil-water mixture is treated with sodium and extracted with methylene chloride. The extracts are dried over anhydrous sodium sulfate and treated with "Darco" charcoal. Removal of the charcoal and solvent gives an oil which crystallizes upon treatment with methanol. The crystals are filtered and washed to give 0.342 g. of the desired imidazoline compound; M.P. 151.5°–153.5° C.

I.R. $\nu_{max.}^{KBr}$ (cm.$^{-1}$) 3390, 3080, 2860, 1645

P.M.R. $T_{CDCl_3}$ 1.89 (1H, multiplet), 2.70 (3H, multiplet), 3.33 (1H, singlet), 5.66 (2H, multiplet), 6.60 (4H, singlet).

(E) 3-(2-imidazolin-2-ylamino) - 2 - chlorobenzo[b] thiophene.—A solution of 0.250 g. (0.00115 mol) of the imidazoline compound of preparation D in 15 ml. of benzene is treated with hydrogen chloride gas. To the reaction mixture is added 0.234 g. (0.00173 mol) of sulfuryl chloride and the mixture heated at reflux for one hour. The reaction mixture is cooled and the product, which precipitates, removed by filtration and triturated with acetone to give 0.269 g. of the desired chloro imidazoline product as the hydrochloride salt; M.P. 236°–238° C.

I.R. $\nu_{max.}^{KBr}$ (cm.$^{-1}$) (hydrochloride salt) 3080 (broad), 1645, 1600

P.M.R. $T_{(CD_3)_2SO}$ (hydrochloride salt) 1.41 (2H, singlet), 2.0 (1H, multiplet), 2.50 (3H, multiplet), 6.36 (4H, singlet).

EXAMPLE VI 4-(2-imidazolin-2-ylamino)-3,5-dichlorobenzo[b] thiophene (A) 2-chloro-5-nitrobenzonitrile.—To a cooled solution (15° C.) of 300 g. (0.218 mol) of 2-chlorobenzonitrile in 1500 ml. of concentrated nitric acid is added dropwise 1200 ml. of concentrated sulfuric acid. The temperature of the solution is kept below 20° C. during the sulfuric acid addition. After the addition is complete, the reaction is stirred at room temperature for four days, then poured into 7 liters of ice water, and the resulting precipitate filtered and dried to give 323 g., 82% yield, of 2-chloro-5-nitrobenzonitrile; M.P. 101°–103° C.

(B) Methyl 3-amino-5-nitrobenzo[b]thiophene-2-carboxylate.—To a chilled mixture (15° C.) of 277.5 g. (2.475 mols) of potassium t-butoxide in 2250 ml. of tetrahydrofuran is added a solution of 262.5 g. (2.475 mols) of methyl thioglycolate in 300 ml. of tetrahydrofuran over a period of 0.75 hour. The reaction is allowed to warm to room temperature and a solution of 300 g. (1.65 mols) of 2-chloro-5-nitrobenzonitrile in 1500 ml. of tetrahydrofuran added over a period of one hour. The reaction is stirred at 30° C. for forty minutes, then poured into 7 liters of water. The resulting precipitate is filtered, washed with ether and dried to give 376 g., 91% yield, of the desired amino ester; M.P. 240°–242° C.

(C) Methyl 3 - chloro-5-nitrobenzo[b]thiophene-2-carboxylate.—The product of preparation B, 130 g. (0.515 mol) and 1190 ml. of hot glacial acetic acid are placed in a beaker and the suspension cooled to 15° C. It is then gradually added to a well stirred solution of sodium nitrite in concentrated sulfuric acid (previously prepared by adding 79.3 g. (1.15 mols) of sodium nitrite to 554 ml. of cold concentrated sulfuric acid, warming the mixture to 70° C. until the nitrite dissolved, and then cooling rapidly to 10° C.). Upon completion of the addition of the amino ester, the diazonium solution is added slowly to a solution of 99.06 g. (1.01 mols) of cuprous chloride in 793 ml. of concentrated hydrochloric acid. The reaction is stirred at room temperature for one hour, then poured into 3.5 liters of ice water. The aqueous mixture is stirred overnight, filtered and dried to give 103.9 g., 76.5 percent yield, of the title chloro ester; M.P. 160°–164° C. The crude product, upon recrystallization from ethanol, melts at 195°–197° C.

(D) Sodium 3-chloro-5-nitrobenzo[b]thiophene-2-carboxylate.—In a 5-liter round bottom flask fitted with a mechanical stirrer, there is placed 303 g. (1.11 mols) of the chloro ester (preparation C) 800 ml. of 95% ethanol and 600 ml. of 10% aqueous sodium hydroxide. The suspension is heated at 40° C. for thirty minutes, then cooled and the acid salt filtered and dried to yield 264 g., 85%, of the desired product.

(E) 3-chloro - 5 - nitrobenzo[b]thiophene. — A wellstirred solution of 66 g. (0.24 mol) of acid salt (preparation D) in 660 ml. of tetramethylene sulfone is heated at 180° C. for approximately twenty-five minutes (ten minutes after bubbling ceased). The reaction is allowed to cool, then treated with one liter of water and the product, which precipitates, filtered. Drying of the crude product gives 37.9 g., 76% of 3-chloro-5-nitrobenzo[b] thiophene; M.P. 147°–150° C. Recrystallization of a small portion of the crude product from ethanol gives material which melts at 153°–154° C.

(F) 5-amino-3-chlorobenzo[b]thiophene.—To a suspension of 112.7 g. (0.528 mol) of 3-chloro-5-nitrobenzo [b]thiophene and 310 g. of iron filings in 565 ml. of water there is added dropwise 127 ml. of concentrated hydrochloric acid. The reaction mixture is refluxed for twelve hours, then cooled, neutralized with concentrated ammonium hydroxide and extracted with hot chloroform. The extracts are dried over anhydrous sodium sulfate, decolorized with charcoal, then filtered. Evaporation of the solvent gives an oil which solidifies to yield 78.8 g., 81.3%, of crude product; M.P. 62°–65° C.

(G) 5-acetamido - 3 - chlorobenzo[b]thiophene.—A mixture of 165 ml. of acetic anhydride and 78.8 g. (0.430 mol) of the chloro amine of preparation F is stirred at room temperature for fifteen minutes, then poured into 1000 ml. of water. Filtration of the product followed by recrystallization from benzene gives 66.6 g., 69 percent, of the desired amide; M.P. 174°–175° C.

(H) 5-acetamido - 3 - chloro - 4 - nitrobenzo[b]thiophene.—Concentrated sulfuric acid (11.5 ml.) is added dropwise to a chilled suspension (~10° C.) of 22 g. (0.098 mol) of 5-acetamido-3-chlorobenzo[b]thiophene in 264 ml. of concentrated nitric acid. The reaction temperature is kept below 10° C. during the sulfuric acid addition. The suspension is stirred for one hour at 5° C. then poured onto crushed ice. The resulting yellow precipitate is filtered, dissolved in chloroform and dried over anhydrous sodium sulfate. The dried solution is decolorized, filtered and concentrated to give 20.33 g., 17%, of nitrated product; M.P. 165°–168° C. A small sample, recrystallized from ethanol, melts at 178°–179° C.

(I) 5 - amino-3-chloro-4-nitrobenzo[b]thiophene.—To a suspension of 20.33 g. (0.075 mol) of the nitrated product of preparation H in 350 ml. of 90% ethanol is added 3.30 g. (0.083 mol) of sodium hydroxide pellets. The reaction is refluxed for 1.5 hours, then cooled and poured into ice water. The resulting precipitate is filtered and air dried to give 14.06 g., 84 percent, of product; M.P. 127°–129° C.

(J) 3,5-dichloro-4-nitrobenzo[b]thiophene.—A cooled suspension (15° C.) of 37.54 g. (0.164 mol) of the nitro amine of preparation I above in 390 ml. of glacial acetic acid is gradually added to a well stirred solution (prepared as described in preparation C above) of 25.28 g. (0.367 mol) of sodium nitrite in 177 ml. of concentrated sulfuric acid. The diazonium solution is added slowly to a solution of 31.8 g. (0.322 mol) of cuprous chloride in 255 ml. of concentrated hydrochloric acid. Upon completion of the diazonium addition, the reaction is stirred at 25° C. for one hour, then poured into ice water and the yellow precipitate filtered. Drying of the product yields 32.03 g., 79 percent, of 3,5 - dichloro-4-nitrobenzo[b]thiophene; M.P. 134°–137° C.

(K) 4-amino-3,5-dichlorobenzo[b]thiophene.—A solution of 0.300 g. (0.00795 mol) of sodium borohydride in 10 ml. of water is added to an aqueous suspension (under nitrogen) of 0.00198 g. of 10 percent Pd/C in 10 ml. of water. To the reaction mixture is then added a solution of 1.0 g. (0.0040 mol) of 3,5-dichloro-4-nitrobenzo[b]thiophene in 100 ml. of methanol. The reaction mixture is stirred at 25° C. for 1.75 hours and the catalyst removed by filtration under nitrogen. The methanol is evaporated, the green solid filtered, then dissolved in chloroform. The solution is dried over anhydrous sodium sulfate, treated with charcoal, filtered and concentrated to dryness to give 373 mg., 43.2 percent of product. Recrystallization of the crude product from ethanol gives purified material melting at 94°–95.5° C.

(L) 1-(3,5-dichloro - 4 - benzo[b]thiophenyl)-2-thiourea.—Benzoylchloride (4.12 ml., 0.0357 mol) is added to a solution (under nitrogen) of 2.99 g. (0.0393 mol) of ammonium thiocyanate in 25 ml. of acetone. The reaction is heated at reflux for fifteen minutes, then treated with a solution of 8.0 g. (0.0357 mol) of the dichloro amine of preparation K in 100 ml. of acetone. The reaction mixture is refluxed for two hours, then cooled and poured into ice water. The resulting precipitate of benzoylthiourea (M.P. 215°–217° C.) is filtered, washed with ether, and placed in a solution of 250 ml. of 10% aqueous sodium hydroxide in 350 ml. of water. The solution is stirred at 80° C. for two hours, filtered and acidified with concentrated hydrochloric acid. The mixture is then made basic (pH ~8) with concentrated ammonium hydroxide, cooled and the filtered precipitate washed with ether to give 6.57 g., 66.5%, of the dichloro thiourea; M.P. 198°–200° C.

(M) 2 - methyl - 2 - thio-1-(3,5-dichloro-4-benzo[b]thiophenyl)pseudourea hydroiodide.—A solution of 6.371 g. (0.0230 mol) of the dichloro thiourea prepared above and 5.62 g. (2.46 ml., 0.0395 mol) of methyl iodide in 100 ml. of methanol is heated at reflux for one-half hour. The reaction mixture is then cooled and concentrated to ⅓ its volume. The solution is treated with ether, cooled and the precipitate filtered to yield 9.12 g., 95%, of the thiouronium salt; M.P. 203°–205° C.

(N) 4-(2-imidazolin - 2 - ylamino)-3,5-dichlorobenzo[b]thiophene.—A mixture of 5.0 g. (0.01198 mol) of the thiouronium salt (preparation M) and 2.38 ml. (0.03579) mol) of ethylenediamine is heated at 130° C. on an oil bath for seven hours. The reaction mixture is cooled, made alkaline with 10% aqueous sodium hydroxide and extracted with chloroform. The extract is dried over anhydrous sodium sulfate, treated with charcoal, filtered and concentrated to an oil. The oil is dissolved in ethanol and treated with hydrogen chloride gas. The white precipitate which forms, the hydrochloride salt of ethylenediamine, is removed and a layer of ether placed over the filtrate. The precipitate thus produced is filtered and washed with ether to give 0.980 g. of the crude imidazoline product. Repetition of the ether treatment produces another 1.438 g. of the product. The combined solids are recrystallized from ethanol-ethyl acetate to give 1.23 g., 32%, of the pure imidazoline compound; M.P. 337°–338° C.

I.R. $\nu_{max.}^{KBr}$ (cm.$^{-1}$) 3090, 1670, 1600

P.M.R. T$_{(CD_3)_2SO}$—1.0 (1H, singlet, 1.55 (2H, multiplet), 1.75 (1H, doublet), 1.88 (1H, singlet), 2.27 (1H, doublet), 6.34 (4H, singlet).

EXAMPLE VII 3-(2-imidazolin-2-ylamino)-2-bromobenzo[b]thiophene hydrobromide

To a solution of 0.1577 g. (0.000724 mol) of 3-(2-imidazolin-2-ylamino)-benzo[b]thiophene (Example V–D) in 16 ml. of chloroform there is added a solution of 0.1215 g. (0.000758 mol) of bromine in 8 ml. of chloroform. The reaction is stirred at room temperature for twenty-four hours and the precipitated product filtered to give 0.2170 g., 79.5%, of the desired hydrobromide salt; M.P. 233°–234° C.

I.R. $\nu_{max.}^{KBr}$ (cm.$^{-1}$) (hydrobromide salt) 3180, 1670, 1627

EXAMPLE VIII 6-(2-imidazolin-2-ylamino)5,7-dichlorobenzo[b]thiophene

Following the procedure of Example IA–C, 6-aminobenzo[b]thiophene is converted to 6 - (2 - imidazolin-2-ylamino)benzo[b]thiophene. Chlorination of this product with thionyl chloride (2 molar proportions) in benzene at reflux for two hours produces the title compound which is recovered by removal of all volatiles under reduced pressure.

EXAMPLE IX 7-(2-imidazolin-2-ylamino)-6-chlorobenzo[b]thiophene (A) 6 - acetamidobenzo[b]thiophene.—A solution of 7.45 g. (0.05 mol) of 6-aminobenzo[b]thiophene, and 6 ml. (0.056 mol) of acetic anhydride in 15 ml. of glacial acetic acid is heated at 60° C. for twenty minutes. The mixture is then cooled, poured into 100 ml. of water and the product recovered by filtration.

(B) 6-acetamido-7-nitrobenzo[b]thiophene.—A solution of 7.3 g. (0.038 mol) of 6-acetamidobenzo[b]thiophene in 30 ml. of acetic acid is cooled in an ice bath and 2.5 ml. (0.039 mol) of concentrated nitric acid added. The mixture is stirred, allowed to warm at room temperature, and held at room temperature for four hours. The product is precipitated by pouring the reaction mixture into a water-ice mixture. It is purified by recrystallization from ethanol.

13

The thus obtained compound is then put through the following sequence of procedures to give the indicated products:

VI–I to give 6-amino-7-nitrobenzo[b]thiophene;
VI–C to give 6-chloro-7-nitrobenzo[b]thiophene;
VI–K to give 6-chloro-7-aminobenzo[b]thiophene;
VI–L to give 1-(6-chloro-7-benzo[b]thiophenyl)-2-thiourea;
VI–M to give 2-methyl-2-thio-1-(6-chloro-7-benzo[b]thiophenyl)-pseudourea hydriodide;
VI–N to give 7-(2-imidazolin-2-ylamino)-6-chlorobenzo[b]thiophene.

EXAMPLE X 2-(2-imidazolin-2-ylamino)-3-chlorobenzo[b]thiophene 3-chlorobenzo[b]thiophene is nitrated according to the procedure of Example VI–H to give 3-chloro-2-nitrobenzo[b]thiophene. Utilization of this product in the sequence of procedures below affords the following products:

VI–K to give 2-amino-3-chlorobenzo[b]thiophene;
VI–L to give 1-(3-chloro-2-benzo[b]thiophenyl)-2-thiourea;
VI–M to give 2-methyl-2-thio-1-(3-chloro-2-benzo[b]-thiophenyl)-pseudourea hydriodide;
VI–N to give 2-(2-imidazolin-2-ylamino)-3-chlorobenzo[b]thiophene.

EXAMPLE XI 5-(2-imidazolin-2-ylamino) - 3,4 - dibromobenzo[b]thiophene and 5-(2-imidazolin-2-ylamino)-3,4,6-tribromobenzo[b]thiophene Repetition of the procedure of Example II but using N-bromosuccinimide in place of N-chlorosuccinimide produces the title compounds.

EXAMPLE XII

The following compounds are prepared from appropriate reactants by the above procedures:

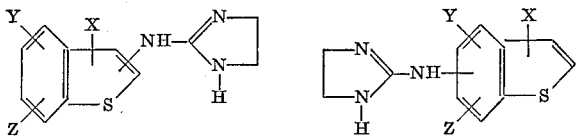

| AI* | X | Y | Z | Example |
|---|---|---|---|---|
| 2 | 3-Br | H | H | X |
| 4 | H | 5-Br | H | III-A, IV-A-D |
| 4 | H | 5-Br | 7-Br | III-A-E |
| 4 | 3-Br | 5-Br | H | IV-C-N |
| 6 | H | 5-Br | 7-Br | VIII |
| 7 | H | 6-Br | H | VI-C, K, L, M, N |

*AI= (2-imidazolin-2-ylamino).

14

In each of the examples, the chloro reactant is replaced by the corresponding bromo reactant; e.g., $SOCl_2$ by $SOBr_2$; $Cu_2Cl_2$—HCl by $Cu_2Br_2$—HBr.

What is claimed is:
1. A substituted benzo[b]thiophene selected from the group consisting of those wherein the substituents are:
   (a) 5-(2-imidazolin-2-ylamino)-3,4-dichloro-,
   (b) 5-(2-imidazolin-2-ylamino)-3,4,6-trichloro-,
   (c) 4-(2-imidazolin-2-ylamino)-5-chloro-,
   (d) 4-(2-imidazolin-2-ylamino)-5,7-dichloro-,
   (e) 4-(2-imidazolin-2-ylamino)-3,5-dichloro-,
   (f) 6-(2-imidazolin-2-ylamino)-5,7-dichloro-,
   (g) 7-(2-imidazolin-2-ylamino)-6-chloro-,
   (h) 3-(2-imidazolin-2-ylamino)-2-chloro-,
   (i) 2-(2-imidazolin-2-ylamino)-3-chloro-,
the corresponding bromo analogs; or a pharmaceutically-acceptable acid addition salt thereof.

2. 4-(2-imidazolin-2-ylamino) - 3,5 - dichlorobenzo[b]thiophene, a compound according to claim 1(e), or a pharmaceutically-acceptable acid addition salt thereof.

3. 3 - (2-imidazolin-2-ylamino)-2-chlorobenzo[b]thiophene, a compound according to claim 1(h), or a pharmaceutically-acceptable acid addition salt thereof.

4. 5-(2-imidazolin-2-ylamino) - 3,4 - dichlorobenzo[b]thiophene, a compound according to claim 1(a), or a pharmaceutically-acceptable acid addition salt thereof.

5. 4-(2-imidazolin-2-ylamino) - 5,7 - dichlorobenzo[b]thiophene, a compound according to claim 1(d), or a pharmaceutically-acceptable acid addition salt thereof.

6. 3 - (2-imidazolin-2-ylamino)-2-bromobenzo[b]thiophene, a compound according to claim 1, or a pharmaceutically-acceptable acid addition salt thereof.

7. 4-(2-imidazolin-2-ylamino) - 3,5 - dichlorobenzo[b]thiophene hydrochloride, a compound according to claim 3.

References Cited

UNITED STATES PATENTS

| | | | |
|---|---|---|---|
| 2,457,047 | 12/1948 | Kyrides | 260—309.6 |
| 3,438,995 | 4/1969 | Faust et al. | 260—309.6 |
| 3,462,433 | 8/1969 | Stahle et al. | 260—309.6 |
| 3,549,624 | 12/1970 | Conover et al. | 260—309.6 |

OTHER REFERENCES

Merck I Chem. Abst., vol. 58, column 12574 (1963).
Merck II Chem. Abst., vol. 61, column 4146 (1964).
Scholz Ind. Eng. Chem., vol. 37, pages 120–25 (1945).
Urech et al.: Helv. Chim. Acta, vol. 33, pages 1386–9 and 1403–6 relied on (1950).

NATALIE TROUSOF, Primary Examiner

U.S. Cl. X.R.

260—330.5, 465 G; 424—273

PO-1050
(5/69)

UNITED STATES PATENT OFFICE
CERTIFICATE OF CORRECTION

Patent No. 3,740,417     Dated June 19, 1973

Inventor(s) Hans-Jurgen E. Hess and Roger P. Nelson

It is certified that error appears in the above-identified patent and that said Letters Patent are hereby corrected as shown below:

Column 14, Line 35, "3" should read -- 2 --.

Signed and sealed this 24th day of September 1974.

(SEAL)
Attest:

McCOY M. GIBSON JR.
Attesting Officer

C. MARSHALL DANN
Commissioner of Patents